(12) United States Patent
Jacobson

(10) Patent No.: US 9,538,742 B2
(45) Date of Patent: Jan. 10, 2017

(54) REFLECTIVE FLY REPELLENT BALL DEVICE OF BEAD FACETS AND MULTIPLE WATER MOLECULES THAT REPEL FLIES

(71) Applicant: Kenneth Raymond Jacobson, Edmonds, WA (US)

(72) Inventor: Kenneth Raymond Jacobson, Edmonds, WA (US)

( * ) Notice: Subject to any disclaimer, the term of this patent is extended or adjusted under 35 U.S.C. 154(b) by 0 days.

(21) Appl. No.: 14/792,612

(22) Filed: Jul. 7, 2015

(65) Prior Publication Data

US 2016/0227757 A1 Aug. 11, 2016

Related U.S. Application Data

(60) Provisional application No. 62/022,476, filed on Jul. 9, 2014.

(51) Int. Cl.
*A01M 29/06* (2011.01)
*A01M 29/08* (2011.01)
*A01M 1/04* (2006.01)
*A01M 29/00* (2011.01)

(52) U.S. Cl.
CPC .............. *A01M 29/08* (2013.01); *A01M 1/04* (2013.01); *A01M 29/00* (2013.01); *A01M 29/06* (2013.01)

(58) Field of Classification Search
CPC ...... A01M 29/00; A01M 29/06; A01M 29/08; A01M 1/04; A44C 11/002
USPC .. 43/132.1, 124, 113, 122; 116/22 A; 63/33, 63/38; 40/410, 409, 406; 472/65; 428/13, 428/14, 7, 11
See application file for complete search history.

(56) References Cited

U.S. PATENT DOCUMENTS

| 972,092 | A | * | 10/1910 | Berlinger | 43/122 |
|---|---|---|---|---|---|
| 1,053,714 | A | * | 2/1913 | Crichton | 43/122 |
| 1,287,494 | A | * | 12/1918 | Stachura | 43/122 |
| 1,287,968 | A | * | 12/1918 | Greenleaf | G08B 3/06 116/22 A |
| 1,297,894 | A | * | 3/1919 | Navrot | 43/122 |
| 1,364,949 | A | * | 1/1921 | Niewinski | A01M 1/10 43/122 |
| 1,441,924 | A | * | 1/1923 | Hartmann | A44C 11/002 63/38 |
| 1,528,463 | A | * | 3/1925 | Yungk | G10K 1/071 428/11 |

(Continued)

FOREIGN PATENT DOCUMENTS

| GB | 2269153 A | * | 2/1994 | ............ A01M 29/08 |
|---|---|---|---|---|
| GB | 2325452 A | * | 11/1998 | ............. A01K 93/00 |

(Continued)

OTHER PUBLICATIONS

Green Living Tips, Tips for controlling pesky flies; Available web site: http://www.greenlivingtips.com/articles/dealing-with-flies.html; created in Apr. 2008; last updated Jun. 16, 2012; downloaded on Aug. 19, 2016.*

*Primary Examiner* — Darren W Ark
(74) *Attorney, Agent, or Firm* — Bold IP PLLC; John Houvener; Maki Imakura

(57) ABSTRACT

Fly Balls repel files because flies are frightened and confused by the multiple thousands of reflective images they see whenever they are in a Fly Balls' no flies zone. A combination of a flies 4,000 eyes; faceted bead(s) reflections; and multiple water molecule reflections create a visual reflective predator threat to a fly.

5 Claims, 2 Drawing Sheets

(56) References Cited

U.S. PATENT DOCUMENTS

| | | | | | |
|---|---|---|---|---|---|
| 1,786,704 | A | * | 12/1930 | Staneslaus | A01M 1/106 43/122 |
| 1,791,175 | A | * | 2/1931 | Tomlinson | A01K 39/0106 428/11 |
| 2,115,986 | A | * | 5/1938 | Da Costa | A63J 15/00 428/13 |
| 2,450,620 | A | * | 10/1948 | Speicher | A44C 17/006 428/13 |
| 2,452,174 | A | * | 10/1948 | Arnold | B65D 11/00 428/11 |
| 2,621,042 | A | * | 12/1952 | Stein | A63F 9/0079 40/410 |
| 2,842,879 | A | * | 7/1958 | Baumchen | F21S 10/007 40/406 |
| 2,919,510 | A | * | 1/1960 | Guilford | A47F 3/08 40/409 |
| 3,118,427 | A | * | 1/1964 | Stanzel | A01K 13/003 43/131 |
| 3,292,840 | A | * | 12/1966 | Schmidt | B65D 11/02 428/11 |
| 3,387,396 | A | * | 6/1968 | George | F21S 10/002 40/406 |
| 3,679,208 | A | * | 7/1972 | Carrano, Jr. | A63F 9/00 273/138.1 |
| 3,715,823 | A | * | 2/1973 | Brossard | A47G 1/12 428/13 |
| 3,769,929 | A | * | 11/1973 | Scheber | A63B 19/02 428/11 |
| 3,977,458 | A | * | 8/1976 | Kuen | A47H 23/05 428/11 |
| 4,092,798 | A | * | 6/1978 | Oquita | A63H 37/00 428/7 |
| 4,164,284 | A | * | 8/1979 | Witt | B65D 81/3846 428/11 |
| 4,173,667 | A | * | 11/1979 | Rusch | A47G 33/08 428/14 |
| 4,186,682 | A | * | 2/1980 | Longsdorf | G10K 1/071 428/11 |
| 4,360,987 | A | * | 11/1982 | Lowder | A01M 1/02 43/122 |
| 4,493,862 | A | * | 1/1985 | Allbert | A47G 33/08 428/11 |
| 4,794,724 | A | * | 1/1989 | Peters | A01M 1/02 43/122 |
| 4,860,477 | A | * | 8/1989 | Gooch | A47G 33/08 428/11 |
| 4,899,485 | A | * | 2/1990 | Schneidmiller | A01M 1/02 43/122 |
| 4,908,980 | A | * | 3/1990 | Sherman | A01M 1/04 43/132.1 |
| 4,919,926 | A | * | 4/1990 | Watanabe | A01M 29/06 252/582 |
| 4,923,721 | A | * | 5/1990 | Gilmore | A47G 33/0809 428/11 |
| 4,982,100 | A | * | 1/1991 | Harding, Jr. | A01M 29/08 250/493.1 |
| 5,092,065 | A | * | 3/1992 | Teng | G09F 19/02 40/410 |
| 5,102,364 | A | * | 4/1992 | Kubiatowicz | A63H 27/10 428/13 |
| 5,187,889 | A | * | 2/1993 | Kraselsky | G09F 19/02 40/410 |
| 5,359,808 | A | * | 11/1994 | Fitsakis | A01M 1/2016 43/132.1 |
| 5,392,558 | A | * | 2/1995 | Blomquist | A01M 1/02 43/122 |
| 5,596,833 | A | * | 1/1997 | Harrie | A01M 1/04 43/122 |
| 5,603,176 | A | * | 2/1997 | Eddins | G09F 19/08 40/409 |
| 5,607,711 | A | * | 3/1997 | Lagunas-Solar | A01M 1/226 426/248 |
| 5,666,750 | A | * | 9/1997 | Segan | G09F 19/08 40/410 |
| 6,042,022 | A | * | 3/2000 | Rogozinski | B05B 11/0005 40/410 |
| 6,135,843 | A | * | 10/2000 | Merk | G09F 19/02 40/410 |
| 6,385,880 | B1 | * | 5/2002 | Naragon | G09F 19/02 40/410 |
| 6,399,167 | B1 | * | 6/2002 | Lewis, Jr. | A47G 33/08 428/13 |
| 6,499,854 | B2 | * | 12/2002 | Chen | F21S 6/002 40/406 |
| 6,543,180 | B2 | * | 4/2003 | Pace | A01M 29/12 43/122 |
| 6,601,337 | B1 | * | 8/2003 | McKenney, Sr. | A01M 1/02 43/132.1 |
| 6,604,317 | B1 | * | 8/2003 | Newman | A01M 1/02 43/122 |
| 6,708,445 | B1 | * | 3/2004 | Israely | A01M 1/02 43/132.1 |
| 6,814,021 | B1 | * | 11/2004 | Turkewitz | A01M 29/06 116/22 A |
| 7,225,851 | B2 | * | 6/2007 | Schonbek | F21S 8/065 160/332 |
| 7,758,400 | B2 | * | 7/2010 | Moomaw | G09F 15/00 40/412 |
| 7,766,717 | B2 | * | 8/2010 | Shapiro | G09F 19/08 40/409 |
| 7,784,215 | B2 | * | 8/2010 | Cohnstaedt | A01M 1/04 43/113 |
| 7,930,989 | B2 | * | 4/2011 | Doty, III | A01M 29/06 116/22 A |
| 7,988,984 | B2 | * | 8/2011 | Hockaday | A01M 1/02 43/132.1 |
| 8,479,678 | B1 | * | 7/2013 | Sandoval | A01M 29/08 43/124 |
| 8,689,473 | B2 | * | 4/2014 | James | G09F 19/02 40/410 |
| 9,095,131 | B2 | * | 8/2015 | Palermo | A01M 29/06 |
| 2002/0005006 | A1 | * | 1/2002 | Phillips | A01M 1/04 43/113 |
| 2002/0184801 | A1 | * | 12/2002 | Naragon | G09F 19/02 40/410 |
| 2003/0145793 | A1 | * | 8/2003 | Mathews | A01M 29/08 119/6.5 |
| 2006/0275562 | A1 | * | 12/2006 | Kleinsasser | B44C 5/00 428/11 |
| 2006/0283062 | A1 | * | 12/2006 | Moomaw | G09F 15/00 40/410 |
| 2007/0141945 | A1 | * | 6/2007 | Chipman | A01M 29/06 446/72 |
| 2007/0251460 | A1 | * | 11/2007 | Olsen | A01M 29/08 119/61.53 |
| 2009/0031612 | A1 | * | 2/2009 | Hubbard | A01M 29/08 43/132.1 |
| 2011/0056243 | A1 | * | 3/2011 | Asscher | A44C 9/0053 63/33 |
| 2011/0219664 | A1 | * | 9/2011 | Casteel | A01M 29/08 43/107 |
| 2012/0055074 | A1 | * | 3/2012 | Batten, II | A01M 29/10 43/132.1 |
| 2014/0153121 | A1 | * | 6/2014 | Savage | A01M 29/08 359/850 |
| 2014/0261151 | A1 | * | 9/2014 | Ronning | A01M 29/10 116/22 A |
| 2015/0027032 | A1 | * | 1/2015 | Batten, II | A01M 29/10 43/113 |

FOREIGN PATENT DOCUMENTS

| | | | |
|---|---|---|---|
| JP | 52021176 A | * | 2/1977 |
| JP | 11018665 A | * | 1/1999 |
| JP | 2001120155 A | * | 5/2001 |
| JP | 2001269105 A | * | 10/2001 |

(56) References Cited

FOREIGN PATENT DOCUMENTS

| | | | | | |
|---|---|---|---|---|---|
| JP | 2001299184 | A | * | 10/2001 | |
| JP | 2002159252 | A | * | 6/2002 | |
| WO | WO 2008051685 | A2 | * | 5/2008 | ............ A01M 29/06 |

* cited by examiner

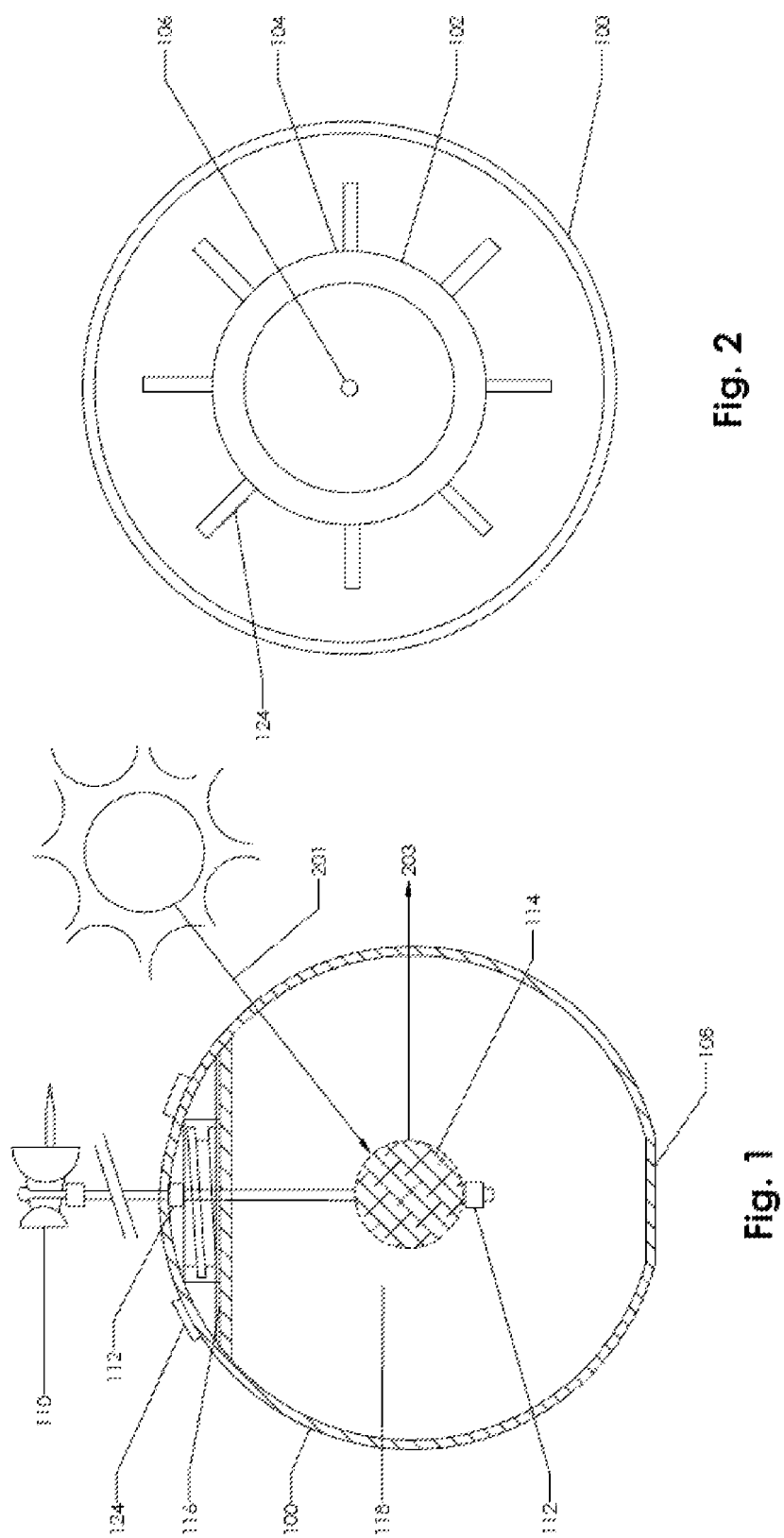

REFLECTIVE FLY REPELLENT BALL DEVICE OF BEAD FACETS AND MULTIPLE WATER MOLECULES THAT REPEL FLIES

CROSS-REFERENCE TO RELATED APPLICATIONS

The present application is a nonprovisional application which claims the benefit of U.S. Provisional Patent Application No. 62/022,476 filed Jul. 9, 2014, entitled "Reflective Fly Repellent Ball Device of Bead Facets and Multiple Water Molecules that Repel Flies," and which are both incorporated herein by reference in their entirety as if fully set forth herein.

FIELD OF THE DISCLOSURE

This disclosure relates generally to the field of fly repellant devices and the deterrence, abatement and prevention of flies in a local area.

BACKGROUND

Generic flies are a world-wide annoyance that are generally attracted to human food among other sources of heat, moisture and areas prone to quick development of bacteria. Flies land on and come into contact with a wide range of decaying organic substances either in search of food or a place to lay their eggs and the fly can easily transfer bacteria or disease on those substances to the next landing place. Thus, the spread of bacteria or disease from flies coming into contact with human food or human surroundings is a major health concern. Other annoyances and concerns are: the sound of the buzzing of the flies' wings, landing on the skin or hair, and visual distraction of the flies' flight.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure. Also, the drawings included herein are considered by the applicant to be informal.

FIG. 1 is a side view of the entire device in a preferred embodiment

FIG. 2 is a top view of the entire device in a preferred embodiment

DEFINITIONS

Figure 4:
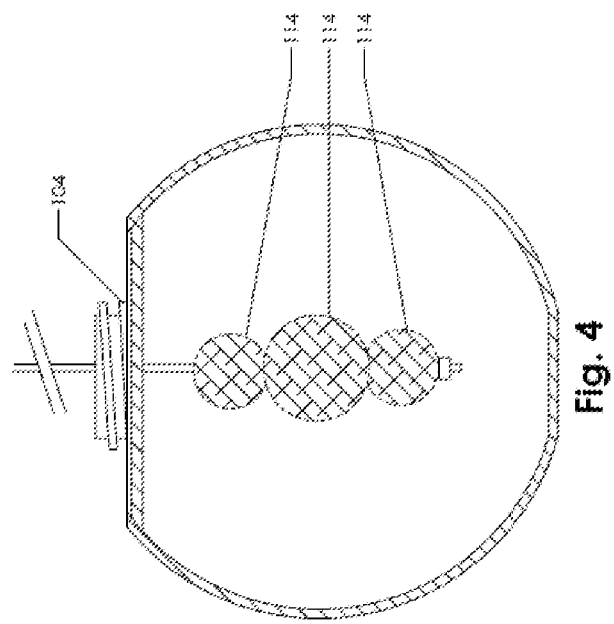
FIG. 4 is a side view of the device with the cap removed in a preferred embodiment
Figure 3:
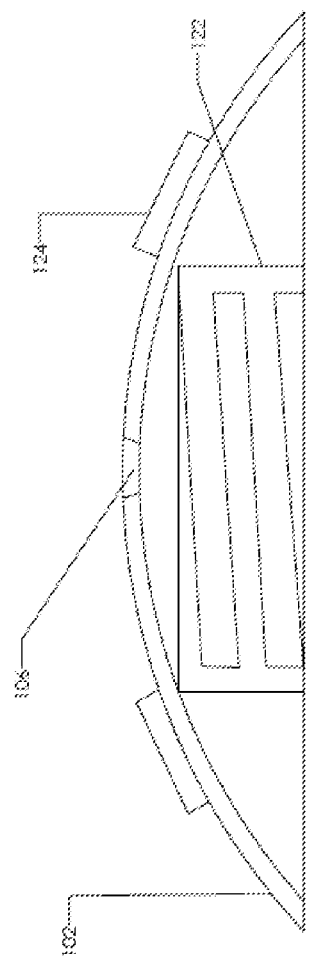
FIG. 3 is a side view of the cap of the device

Flyboll: Is the commercial trade name chosen for the device by which is disclosed herein in this invention and represents generally a reflective fly repellant ball device Fractal(s): Describes one or more discrete instances of visible light which is from the sun and then emitted from the disclosed invention

DETAILED DESCRIPTION

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B and C can consist of (i.e., contain only) components A, B and C, or can contain not only components A, B, and C but also contain one or more other components.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number) -(a second number)," this means a range whose limit is the second number. For example, 25 to 100 mm means a range whose lower limit is 25 mm and upper limit is 100 mm.

The "Flyboll" device uses sunlight to create many thousands of light fractals from sunlight to confuse and/or frighten flies from a local area. The light is refracted through spherical ball which holds water and at least one multi-faceted bead/crystal. The light enters the multi-faceted bead/crystal and then is reflected through the water and then reflected again out of the container. Flies have many thousand eyes and when they receive numerous light signals from a single device their vision becomes distorted and they become disoriented and will avoid the area. The device has demonstrated this effect in numerous private studies and experiments. The Flyboll has a superior effect at deterring the common fly and is an great improvement in the field of fly repellant devices because it is attractive, easier to handle (with no moving parts) and may be hung or placed in any location with a fixed structure. The Flyboll is also safe, virtually unbreakable (when using preferred plastic embodiment) inexpensive and portable.

A preferred embodiment of the device is shown in FIG. 1 is made up of an approximately spherical clear container 100. The container is preferably small (approximately 3 inches in diameter), so that it can be hung indoors, near food or other places where flies are not desired in such a way that the Flyboll is not a distraction due to its size. The wall of the container is relatively thin so that it does not distort the light 201 going into the device or the fractal light 203 going out of the device. The container is preferably made of inexpensive material such as a clear plastic polymer so that light can pass through it. The container could very well be made out of glass, or other clear, rigid material common in the art. Lastly, the container is filled with water 118 to reflect light.

The container is approximately flat at the top 116 and the bottom 108. The top 116 also has a male threaded attachment 104 (See FIG. 4) affixed to it extending upwardly. The flat top receives a cap 102. The cap is preferably secured to the container by a female threaded attachment 122 which mates with the male threaded attachment 104 allowing the cap to be screwed down flush onto the container. The cap is shaped in an approximately partial sphere so that when secured to the container it completes the approximately spherical shape. The bottom of the container 108 is approximately flat to assure stability of the device when placed on a flat surface such as a table or shelf for storing, displaying or using.

FIG. 1 shows a monofilament string 106 which passes through the cap 104 and into the container 100. While a monofilament string is preferred, other types of strings may be used such as wire, ropes or linkages made of metal, wood fiber, plants or synthetic materials. On a far top end, the string is secured in place by using a simple fastener, preferably a push pin 110 to a fixed structure. The length of the string between the push pin and the container may vary depending on how much length is needed to reach a fixed structure to fasten the string to. The knot or end of the string just below the push pin is held in place by a small circular fastener, preferably a metal crimp 112. Another metal crimp 112 is placed just inside the cap in order to maintain the length of string inside the container. The string then passes through the cap into the container where one or more multi-faceted beads 114 are threaded onto the string and attached using a metal crimp 112. The multi-faceted bead may be made of a great many materials including plastic, quartz, diamond, or other material having faceted crystalline structure.

While preferred and alternate embodiments have been illustrated and described, as noted above, many changes can be made without departing from the spirit and scope of the Reflective Fly Repellent Ball Device. Accordingly, the scope of the Reflective Fly Repellent Ball Device is not limited by the disclosure of these preferred and alternate embodiments. Instead, the scope of the Reflective Fly Repellent Ball Device should be determined entirely by reference to the claims. Insofar as the description above and the accompanying drawings (if any) disclose any additional subject matter that is not within the scope of the claims below, the inventions are not dedicated to the public and Applicant hereby reserves the right to file one or more applications to claim such additional inventions.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example of a generic series of equivalent or similar features.

Any element in a claim that does not explicitly state "means for" performing a specified function, or "step for" performing a specific function is not to be interpreted as a "means" or "step" clause as specified in 35. U.S.C. §112 ¶ 6. In particular, the use of "step of" in the claims herein is not intended to invoke the provisions of U.S.C. §112 ¶ 6.

What is claimed is:

1. A fly repellent device comprised of:
    a water-filled transparent container of approximately spherical shape, having a flat top and a flat bottom; the flat top having a cylindrical shaped upwardly protruding threaded attachment in a center of the flat top for securing to a transparent cap;
    a transparent cap of partially spherical shape having an inset threaded portion on a bottom center of the transparent cap for securing to the water-filled transparent container;
    one or more multi-faceted beads positioned inside the water-filled transparent container fastened by a string which passes through the water-filled transparent container.

2. The fly repellent device of claim 1 wherein the water-filled transparent container comprises a plastic polymer.

3. The fly repellent device of claim 1 wherein the one or more multi-faceted beads are tinted in at least one of the following colors: red, orange, yellow, green, blue, purple and black.

4. The fly repellent device of claim 1 wherein one or more metallic clamps are used to position the string fastening the one or more multi-faceted beads.

5. The fly repellent device of claim 1 wherein a securing means for hanging is used to position the fly repellent device in the air by attachment to the string.

\* \* \* \* \*